United States Patent
Guenther

(10) Patent No.: US 8,588,457 B2
(45) Date of Patent: Nov. 19, 2013

(54) LOW COST MOTOR DESIGN FOR RARE-EARTH-MAGNET LOUDSPEAKERS

(75) Inventor: Godehard A. Guenther, Reno, NV (US)

(73) Assignee: Dr. G Licensing, LLC, Reno, NV (US)

( * ) Notice: Subject to any disclaimer, the term of this patent is extended or adjusted under 35 U.S.C. 154(b) by 0 days.

(21) Appl. No.: 12/540,180

(22) Filed: Aug. 12, 2009

(65) Prior Publication Data

US 2009/0304222 A1 Dec. 10, 2009

Related U.S. Application Data

(63) Continuation of application No. 11/390,525, filed on Mar. 27, 2006, now abandoned, which is a continuation of application No. 10/229,695, filed on Aug. 28, 2002, now abandoned, which is a continuation of application No. 09/439,416, filed on Nov. 13, 1999, now abandoned.

(60) Provisional application No. 60/148,863, filed on Aug. 13, 1999.

(51) Int. Cl.
*H04R 25/00* (2006.01)

(52) U.S. Cl.
USPC .......................... 381/401; 381/409; 381/410

(58) Field of Classification Search
USPC ......... 381/117, 400, 401, 402, 403, 407, 409, 381/410, 412, 414, 420
See application file for complete search history.

(56) References Cited

U.S. PATENT DOCUMENTS

| | | | |
|---|---|---|---|
| 2,551,447 A | 5/1951 | Marquis |
| 2,582,130 A | 1/1952 | Johnson |
| 2,769,942 A | 11/1956 | Hassan |
| 3,067,366 A | 12/1962 | Hofman |
| 3,340,604 A | 9/1967 | Parain |
| 3,838,216 A | 9/1974 | Watkins |
| 3,910,374 A | 10/1975 | Holehouse |
| 3,948,346 A | 4/1976 | Schindler |
| 3,979,566 A | 9/1976 | Willy |
| 3,984,346 A | 10/1976 | Gilliland |
| 4,076,097 A | 2/1978 | Clarke |
| 4,122,315 A | 10/1978 | Schroeder et al. |
| 4,151,379 A | 4/1979 | Ashworth |

(Continued)

FOREIGN PATENT DOCUMENTS

| CN | 2140121 | 8/1993 |
|---|---|---|
| CN | 1369190 A | 9/2002 |

(Continued)

OTHER PUBLICATIONS

Electronic Circuits and Applications, Sentura et al., Massachusetts Institute of Technology, John Wiley and Sons, Inc., p. 22 (1975).

(Continued)

*Primary Examiner* — Huyen D Le
(74) *Attorney, Agent, or Firm* — Nutter McClennen & Fish LLP; David J. Powsner

(57) ABSTRACT

A loudspeaker magnetic motor utilizes a voice coil with two or more wire coils that are connected in parallel and that are layered on top of one another. The motor utilizes, as a magnetic field source, a permanent magnet and, more particularly, a permanent magnet that includes a rare earth metal such as a neodymium boron iron magnet.

6 Claims, 7 Drawing Sheets

(56) References Cited

U.S. PATENT DOCUMENTS

| | | |
|---|---|---|
| 4,201,886 A | 5/1980 | Nagel |
| 4,220,832 A | 9/1980 | Nagel |
| 4,300,022 A | 11/1981 | Hastings-James et al. |
| 4,310,849 A | 1/1982 | Glass |
| 4,401,857 A | 8/1983 | Morikawa |
| 4,440,259 A | 4/1984 | Strohbeen |
| 4,472,604 A | 9/1984 | Nakamura et al. |
| 4,477,699 A | 10/1984 | Wada et al. |
| 4,492,826 A | 1/1985 | Chiu |
| 4,552,242 A | 11/1985 | Kashiwabara |
| 4,565,905 A | 1/1986 | Nation |
| 4,577,069 A | 3/1986 | Keezer |
| 4,591,667 A | 5/1986 | Hino et al. |
| 4,737,992 A | 4/1988 | Latham-Brown et al. |
| 4,783,824 A | 11/1988 | Kobayashi |
| 4,799,264 A | 1/1989 | Plummer |
| 4,821,331 A | 4/1989 | Murayama et al. |
| 4,965,837 A | 10/1990 | Murayama et al. |
| 5,008,945 A | 4/1991 | Murayama et al. |
| 5,014,323 A | 5/1991 | Markow et al. |
| 5,027,412 A | 6/1991 | Hayashi et al. |
| 5,040,221 A | 8/1991 | Edwards et al. |
| 5,070,530 A | 12/1991 | Grodinsky et al. |
| 5,115,884 A | 5/1992 | Falco |
| 5,143,169 A | 9/1992 | Ziegenberg et al. |
| 5,155,578 A | 10/1992 | Lim et al. |
| 5,249,236 A | 9/1993 | Sakamoto |
| 5,333,204 A | 7/1994 | Hamada et al. |
| 5,390,257 A * | 2/1995 | Oslac et al. ............ 381/414 |
| 5,402,503 A | 3/1995 | Prokisch |
| 5,446,797 A | 8/1995 | Paddock |
| 5,519,178 A | 5/1996 | Ritto et al. |
| 5,524,151 A | 6/1996 | Bleim |
| 5,548,657 A | 8/1996 | Fincham |
| 5,583,945 A | 12/1996 | Iijima et al. |
| 5,587,615 A | 12/1996 | Murray et al. |
| 5,594,805 A | 1/1997 | Sakamoto et al. |
| 5,604,815 A | 2/1997 | Paddock |
| 5,625,699 A | 4/1997 | Yamada |
| 5,625,701 A * | 4/1997 | Scanlan ............ 381/403 |
| 5,657,392 A | 8/1997 | Bouchard |
| 5,715,324 A | 2/1998 | Tanabe et al. |
| 5,717,775 A * | 2/1998 | Sakamoto et al. ............ 381/400 |
| 5,744,761 A | 4/1998 | Ogura et al. |
| 5,748,760 A | 5/1998 | Button |
| 5,751,828 A | 5/1998 | Ueda et al. |
| 5,802,189 A | 9/1998 | Blodget |
| 5,802,191 A | 9/1998 | Guenther |
| 5,835,612 A | 11/1998 | Fujihira et al. |
| 5,847,333 A | 12/1998 | D'Hoogh |
| 5,867,583 A | 2/1999 | Hazelwood et al. |
| 5,894,524 A * | 4/1999 | Kotsatos et al. ............ 381/397 |
| 5,898,786 A | 4/1999 | Geisenberger |
| 5,909,015 A | 6/1999 | Yamamoto et al. |
| 5,909,499 A | 6/1999 | Tanabe |
| 5,916,405 A | 6/1999 | Ritto et al. |
| 5,917,922 A | 6/1999 | Kukurudza |
| 5,937,076 A * | 8/1999 | Tanabe et al. ............ 381/409 |
| 5,960,095 A | 9/1999 | Chang |
| 6,005,957 A | 12/1999 | Meeks |
| 6,047,077 A | 4/2000 | Larsen |
| 6,067,364 A | 5/2000 | Brinkley et al. |
| 6,175,637 B1 * | 1/2001 | Fujihira et al. ............ 381/412 |
| 6,208,743 B1 | 3/2001 | Marten et al. |
| 6,243,472 B1 | 6/2001 | Bilan et al. |
| 6,269,168 B1 | 7/2001 | Tagami |
| 6,343,128 B1 | 1/2002 | Coffin |
| 6,359,997 B2 | 3/2002 | Geisenberger et al. |
| 6,389,146 B1 | 5/2002 | Croft, III |
| 6,418,231 B1 | 7/2002 | Carver |
| 6,421,449 B1 | 7/2002 | Hasegawa et al. |
| 6,611,606 B2 | 8/2003 | Guenther |
| 6,654,476 B1 | 11/2003 | Guenther |
| 6,704,426 B2 | 3/2004 | Croft, III |
| 6,735,322 B1 | 5/2004 | Watanabe |
| 6,778,677 B2 | 8/2004 | Coffin |
| 6,876,752 B1 | 4/2005 | Guenther |
| 6,993,147 B2 | 1/2006 | Guenther |
| 7,006,653 B2 | 2/2006 | Guenther |
| 7,302,076 B2 | 11/2007 | Guenther |
| 7,532,737 B2 | 5/2009 | Guenther |
| 7,653,208 B2 | 1/2010 | Guenther |
| 2001/0043715 A1 | 11/2001 | Geisenberger et al. |
| 2002/0150275 A1 | 10/2002 | Guenther |
| 2003/0015369 A1 | 1/2003 | Sahyoun |
| 2003/0044041 A1 | 3/2003 | Guenther |
| 2003/0123692 A1 | 7/2003 | Ueki |
| 2003/0228027 A1 | 12/2003 | Czerwinski |
| 2004/0165746 A1 | 8/2004 | Kreitmeier et al. |
| 2004/0231911 A1 | 11/2004 | Welker et al. |
| 2005/0232456 A1 | 10/2005 | Guenther |
| 2006/0159301 A1 | 7/2006 | Guenther |
| 2006/0215870 A1 | 9/2006 | Guenther |
| 2006/0215872 A1 | 9/2006 | Guenther |
| 2006/0239492 A1 | 10/2006 | Guenther |
| 2006/0239493 A1 | 10/2006 | Guenther |
| 2007/0000720 A1 | 1/2007 | Noro et al. |
| 2007/0127760 A1 | 6/2007 | Saiki et al. |
| 2007/0201712 A1 | 8/2007 | Saiki |
| 2008/0247582 A1 | 10/2008 | Guenther |
| 2008/0292117 A1 | 11/2008 | Guenther |
| 2009/0161902 A1 | 6/2009 | Guenther |
| 2009/0304222 A1 | 12/2009 | Guenther |
| 2010/0254564 A1 | 10/2010 | Guenther |

FOREIGN PATENT DOCUMENTS

| | | |
|---|---|---|
| CN | 1439235 A | 8/2003 |
| CN | 1443433 A | 9/2003 |
| DE | 19725373 A1 | 12/1998 |
| EP | 120587 | 10/1984 |
| EP | 0622970 | 11/1994 |
| EP | 0632675 | 1/1995 |
| EP | 1247424 A1 | 10/2002 |
| EP | 1329130 | 7/2003 |
| EP | 1410682 A1 | 4/2004 |
| GB | 2311438 | 9/1997 |
| HK | 1058608 A | 8/2006 |
| HK | 1049425 A | 6/2008 |
| JP | 1012795 A | 1/1989 |
| JP | 10210587 A | 8/1998 |
| JP | 2002-530967 A | 9/2002 |
| JP | 2004-502365 A | 1/2004 |
| JP | 2004-502366 A | 1/2004 |
| WO | 00/30405 A1 | 5/2000 |
| WO | 01/13677 A1 | 2/2001 |
| WO | 02/01913 A1 | 1/2002 |
| WO | 02/01914 A1 | 1/2002 |
| WO | 2006/029378 A2 | 3/2006 |

OTHER PUBLICATIONS

Communication for European Patent Application No. 05795118.8, mailed Nov. 7, 2011.

Communication for European Patent Application No. 05795118.8 enclosing European Search Report, mailed May 6, 2010.

International Search Report for PCT/US99/27011, mailed Feb. 28, 2000.

Communication and Supplementary European Search Report for for EP00954008.9, dated Mar. 25, 2009.

Communication for European Patent Application No. 00954008.9, dated Apr. 14, 2009.

Communication for European Patent Application No. 00954008.9, dated Mar. 29, 2010.

Communication for European Patent Application No. 00954008.9, dated Jun. 29, 2011.

Communication for European Patent Application No. 05795118.8, dated Jun. 29, 2011.

(56) References Cited

OTHER PUBLICATIONS

International Search Report for PCT/US00/22119, mailed Nov. 14, 2000.
International Preliminary Examination Report for PCT/US00/22119, completed Aug. 6, 2002.

Communication for European Patent Application No. 05795118.8, mailed May 25, 2010.

Communication for European Patent Application No. 05795118.8, mailed Apr. 18, 2011.

* cited by examiner

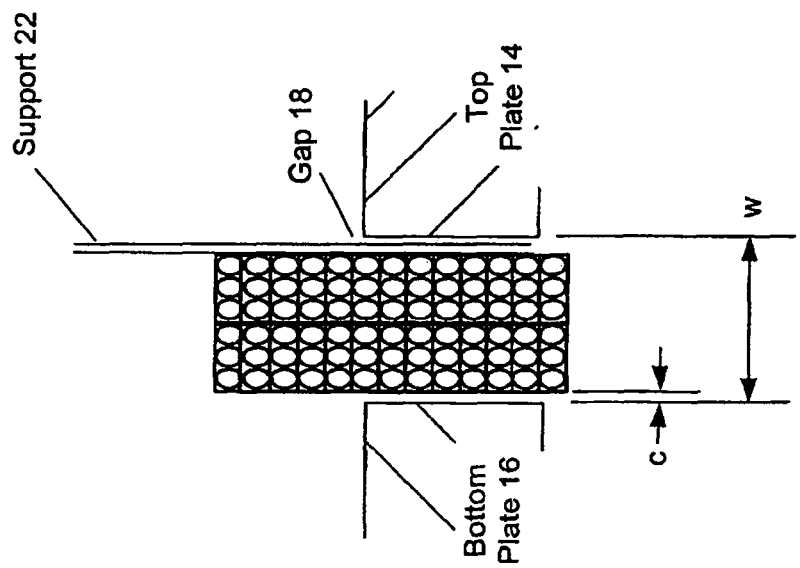
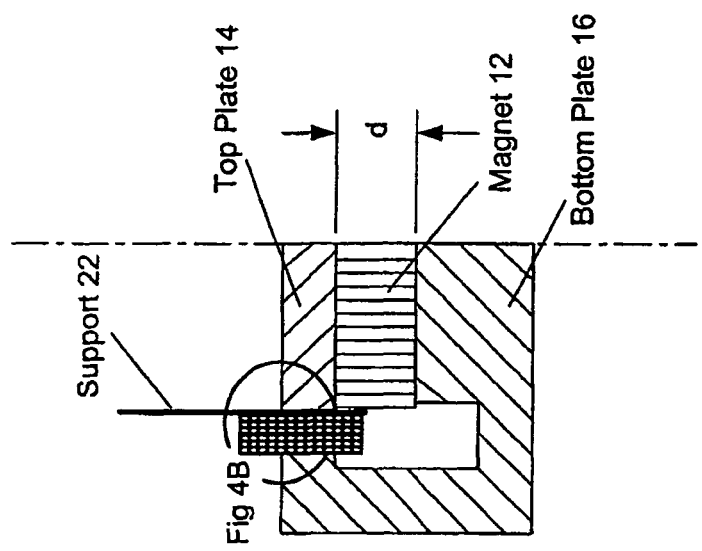
Fig. 4B
Fig. 4A

LOW COST MOTOR DESIGN FOR RARE-EARTH-MAGNET LOUDSPEAKERS

REFERENCE TO RELATED APPLICATIONS

This application is a continuation of U.S. patent application Ser. No. 11/390,525, filed Mar. 27, 2006, entitled "Low Cost Motor Design for Rare-Earth-Magnet Loudspeakers," which is a continuation of U.S. patent application Ser. No. 10/229,695, filed Aug. 28, 2002, entitled "Low Cost Motor Design for Rare-Earth-Magnet Loudspeakers, which is a continuation of U.S. patent application Ser. No. 09/439,416, filed Nov. 13, 1999, entitled "Low Cost Motor Design for Rare-Earth-Magnet Loudspeakers, which claims the benefit of U.S. Provisional Patent Application No. 60/108,338, filed Nov. 13, 1998, the teachings of all four of the aforementioned applications are incorporated herein by reference.

BACKGROUND OF THE INVENTION

The invention relates to loudspeakers and to low-cost magnetic motors for use in loudspeakers. The invention has application, among other places, in cell phones, pagers, MP3 players, and other appliances where weight and size are factors.

A large percentage of loudspeakers are electrodynamic speakers. Such speakers employ a magnetic driver to produce movement of a diaphragm (typically cone or dome-shaped) which, in turn, causes sound. A typical loudspeaker includes a fixed magnet and voice coil. The magnet may be mounted to the rear of the frame behind the diaphragm. A magnetic "circuit" may be utilized to focus and, therefore, intensify the magnetic field in a region referred to as the "air gap". The voice coil is disposed adjacent the magnet and, preferably, within the air gap. The coil typically wire formed about a cylindrical support or "former" which, itself, is attached to the diaphragm.

In operation, electrical audio signals from an amplifier are applied to the voice coil producing a varying electromagnetic field around the coil. The electromagnetic field interacts with the magnetic field produced by the magnet. The magnet is securely fixed to the frame and the voice coil is movable, so the voice coil moves as the two fields interact. Because the voice coil is coupled to the diaphragm via the support, its movement causes the diaphragm to vibrate. The vibration of the diaphragm causes air around the speaker to pressurize and depressurize producing sound waves in the air.

The high energy density of rare earth materials such as neodymium boron iron is attractive for creating and miniaturizing shielded loudspeaker magnets. The magnet rings or discs can best be installed as cores on the inside of the transducers voice coil for easy manufacturing. The maximum storable and extractable energy is then limited by the voice coil diameter and can be increased only by the height of the neodymium slug.

An object of this invention is to provide improved loudspeakers and, more particularly, improved magnetic motors for loudspeakers.

A further object of the invention is to provide such motors that utilize rare earth magnets.

A still further object of the invention is to provide such motors as permit construction of lower impedance, higher BxL neodymium motors for driving loudspeakers.

Yet a still further object is to provide such motors as eliminate the need for multiple magnets and expensive edge winding and offers greater freedom in amplifier matching for best overall system value.

Still yet further objects of the invention are to provide such motors as permit the construction of low voltage sound systems for portable talking appliances like cell phones, note book and palm size computers, pagers, and other interactive wireless appliances.

SUMMARY OF THE INVENTION

The foregoing objects are attained by the invention which provides, in one aspect, a loudspeaker magnetic motor that utilizes a voice coil with two or more wire coils that are connected in parallel and that are layered on top of one another.

Further aspects of the invention provide motors as described above in which the coils are formed from wires that have round cross-sections.

Still further aspects of the invention provide motors as described above in which a first coil is disposed about a voice coil former and in which a second coil is disposed about the first coil.

The invention provides, in other aspects, a motor as described above which includes, as a magnetic field source, a permanent magnet and, more particularly, a permanent magnet that includes a rare earth metal. Related aspects of the invention provide a motor as described above in which the magnetic field source comprises neodymium. One such source is a neodymium boron iron magnet.

Another aspect of the invention provides a motor as described above in which the permanent magnet is "coin shaped" or, more particularly, has a cylindrical cross-section.

Still other aspects of the invention provide a loudspeaker that includes a magnetic motor as described above.

These and other aspects of the invention are evident in the drawings and in the description that follows.

Loudspeaker magnetic motors as provided by the invention feature several advantages over the prior art. They provide a low cost, practical method for maximizing the available force $F=B \times L \times I$ from any "thick" rare earth magnet motor, i.e., one with a permanent magnet with an operating point $B/H >= 2.5$. This leads to an improved cost performance ratio by permitting construction of lower impedance, higher BxL neodymium motors for driving loudspeakers. This also eliminates the need for multiple magnets and expensive edge winding and offers greater freedom in amplifier matching for best overall system value.

BRIEF DESCRIPTION OF THE DRAWINGS

A more complete understanding of the invention may be attained by reference to the drawings, in which:

FIG. 4A shows a cross section of neodymium boron iron magnetic motor using a winding according to the invention;

FIG. 4B details a portion of the drawing shown in FIG. 4A; and

DETAILED DESCRIPTION OF THE ILLUSTRATED EMBODIMENT

Figure 1:
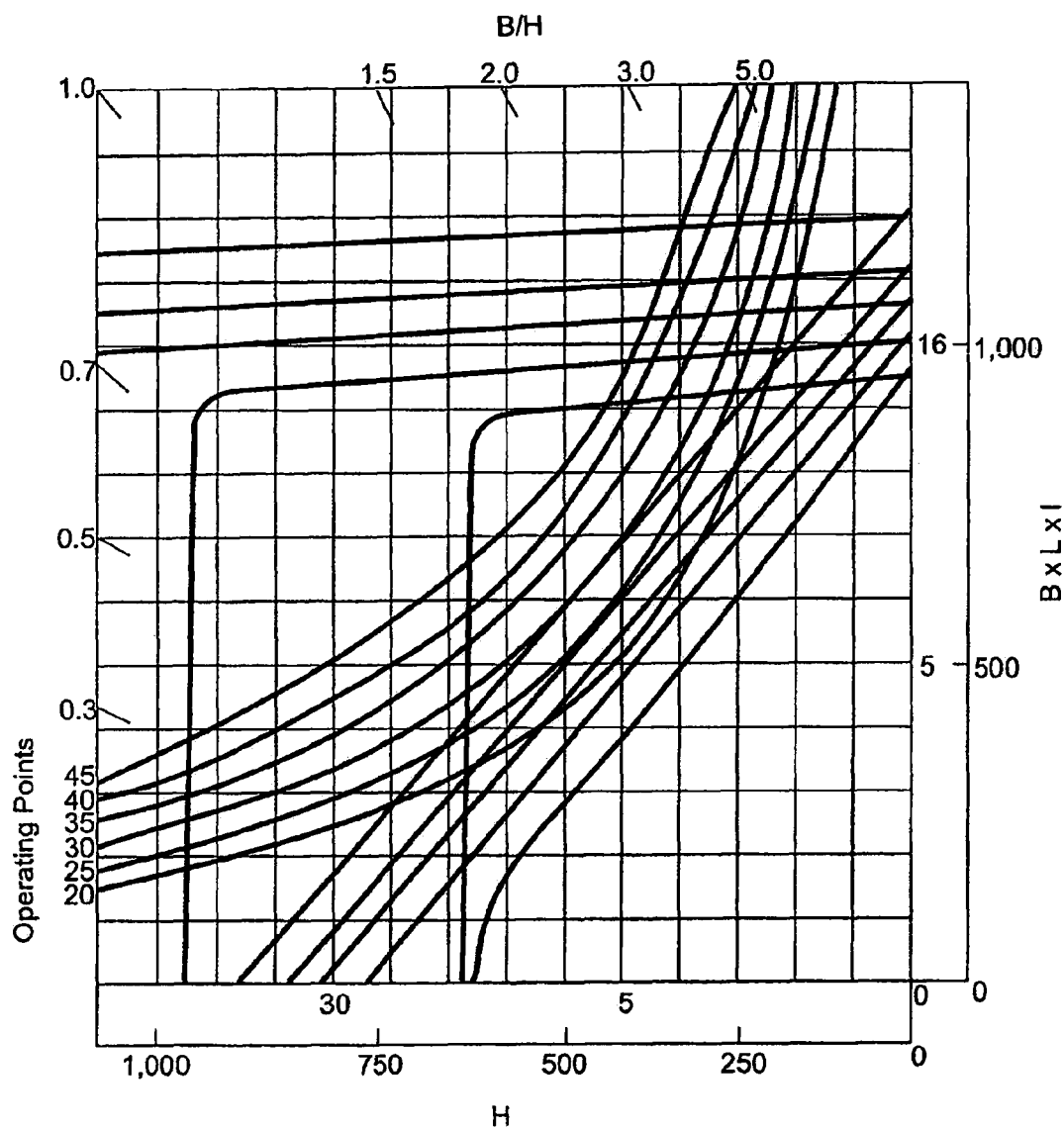
FIG. 1 is a graph showing relationships between flux density (B), coercive force (H) and operating points for various magnetic materials and configurations.

The driving force available to a speaker is B×L×I, where B is the flux density, L the length of coil wire and I the current through the coil wire. For a fixed magnet diameter and gap, the height d and thus the magnetic operating point B/H are rapidly reached where the flux density B in the gap increases very little while the magnet cost increases as its height increases. The full energy product B*H can only be realized for B/H=1. See FIG. 1.

Figure 2B:
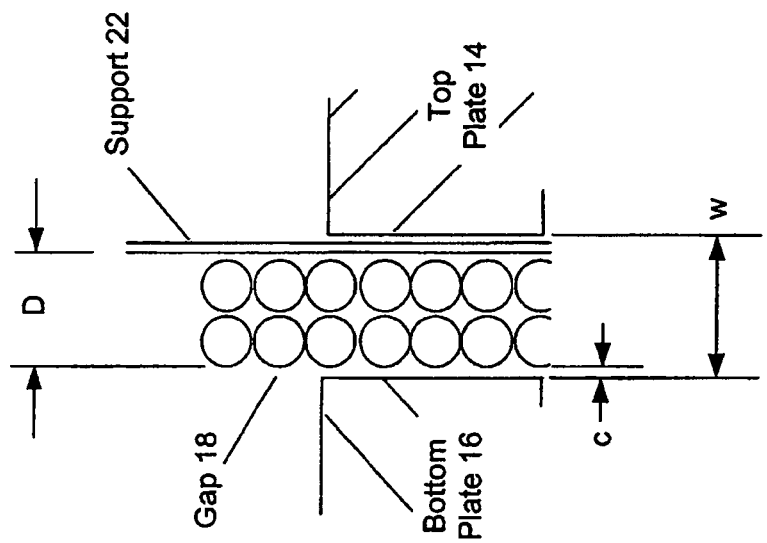
FIGS. 2A and 2B show cross sections of conventional magnetic motor 10. The illustrated motor includes a permanent magnet 12 and a magnetic "circuit" comprising top and bottom plates 14, 16. The plates focus the field of magnet 12 in a gap 18, which is shown in greater detail in FIG. 2B. A voice coil 20 of thickness D is formed about support (or former) 22 at a distance C from the bottom plate 16. The illustrated coil comprises two layers of round wire, i.e., wire having a round cross-section.
Figure 2A:
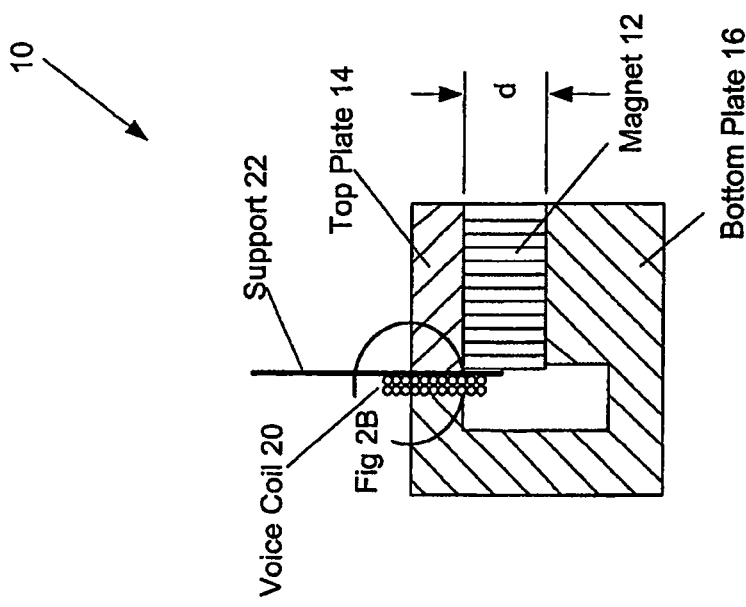

FIGS. 2A and 2B show cross sections of conventional magnetic motor 10. The illustrated motor includes a permanent magnet 12 and a magnetic "circuit" comprising top and bottom plates 14, 16. The plates focus the field of magnet 12 in a gap 18, which is shown in greater detail in FIG. 2B. A voice coil 20 is formed about support (or former) 22. The illustrated coil comprises two layers of round wire, i.e., wire having a round cross-section.

The motor 10 of FIGS. 2A-2B is best suited to "low" magnetic operating-point (B/H) systems with d/w>=2.5, where d is the height of the magnet and w is the width of the gap. A taller magnet with BH>=2.5 improves mainly the temperature stability of the system.

One way to increase the drive force of a magnetic motor of the type shown in FIGS. 2A-2B is to utilize stacked magnets of opposing polarity. This can be costly, though effective.

Figure 3B:
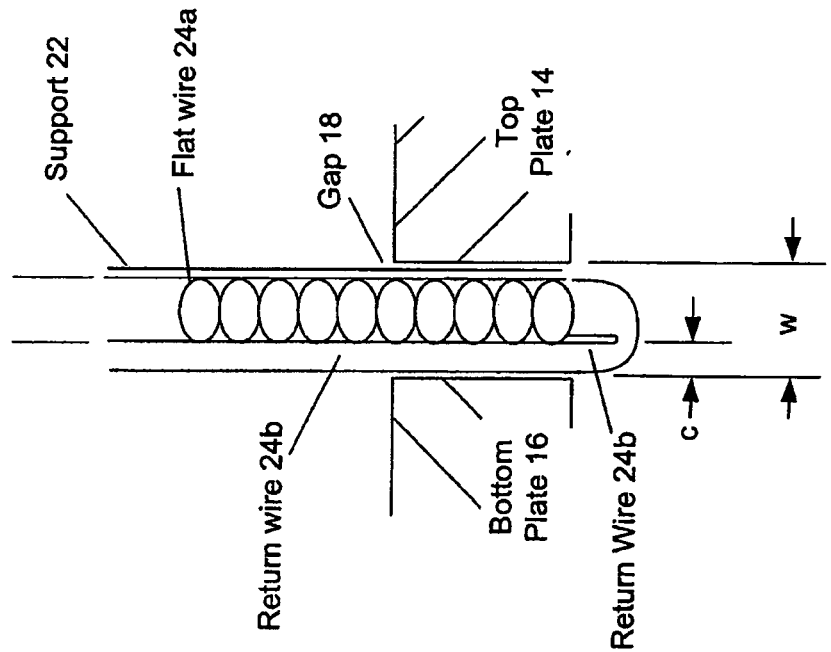
FIG. 3B details a portion of the drawing shown in FIG. 3A.
Figure 3A:
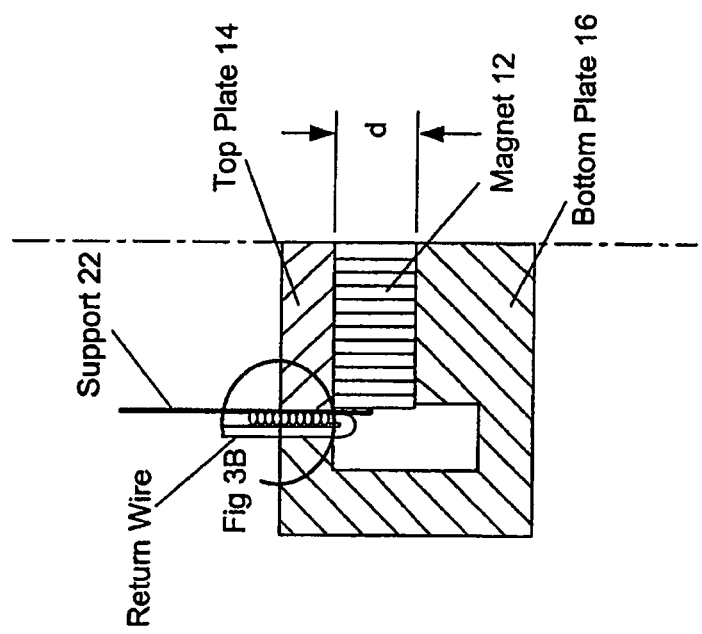
FIG. 3A shows a cross section of magnetic motor using edge winding.

Another way is to use and "edge winding" configuration of the type shown in FIGS. 3A-3B. As shown in FIGS. 3A-3B, the voice coil is formed about support (or former) 22 at a distance C from the bottom plate 16. Here, the active coil wire length L is increased by winding a "flat wire" 24A (i.e., a wire of flattened cross-section) about the support former. This configuration is particularly useful when flux density B itself cannot be improved and, hence, only an increase of wire length L (or current I) can increase the extractable force.

Unfortunately, the process of flat wire coil winding is tedious and too slow for low cost, high volume production. In practice, edge-winding also leads to either heavy or high resistance coils: The coil mass becomes prohibitive if a low resistance is to be maintained or the resistance becomes impracticably high thus reducing the current I.

Another drawback is unfilled gap space needed to clear the return wire 24B, which occupies a portion of the gap 18 and, hence, prevents extraction of energy that might otherwise be attained from the magnetic field within gap.

FIGS. 4A-4B depict a magnetic motor according to one practice of the invention. The motor includes a magnet 12' that preferably comprises a rare earth metal and, more preferably, neodymium. Still, more preferably, it is a neodymium boron iron magnet. Top and bottom plates 14, 16 are comprised of materials of the type conventionally used in connection with such magnets 12'. A voice coil 20' is formed about support (or former) 22 at a distance C from the bottom plate 16.

Voice coil 20' comprises two or more windings of wire or other conductor of the type conventionally used in rare earth magnetic motors. Unlike the conventional configurations (e.g., of the type shown in FIGS. 2A-2B), the multiple windings of coil 20' are connected in parallel. Thus, a first winding is disposed about the cylindrical former 22, a second winding is disposed about the first, a third winding about the second, and so forth. The windings are connected in parallel to one another. As shown in FIGS. 4A and 4B, in the illustrated embodiment the height of the voice coil 20' is greater than a thickness of the voice coil 20'.

A motor according to the invention emulates the edge-wound configuration, without the latter's inherent disadvantages. Such winding multiplies the number of turns L for a given gap length just like a normal round wire coil. The stacked coil sections are then connected in parallel.

In a configuration with multiple windings, for a given applied voltage, the current I increases four-fold compared a conventional two-layer coil (e.g., as shown in FIG. 2) with the same number of turns. The resistance is one fourth of that of the normal coil and the effective number of turns L is cut in half. However, the number of turns L for a given coil height is SQRT(2) times greater than a single-wire coil of the same resistance and height. Coil thickness of the tandem coil is SQRT(2) times that of a single wire coil of equal area.

For a given flux density B, the B×L×I—product is therefore SQRT(2) times larger than a single wire coil of equal area while the mass is approximately the same.

By using a neodymium boron magnet, the motor of FIGS. 4A-4B permit increasing the gap width without suffering the loss of flux density associated with ferrite magnets when widening the magnet gap. Furthermore they enables powerful magnet designs where a "thick" neodymium magnet can be on the inside of the voice coil and still offer a high level of extractable energy. Benefiting applications are hands free cell phones, pagers, MP3 players, and other new interactive talking inter net appliances where weight and size are crucial to the product acceptance.

Figure 5:
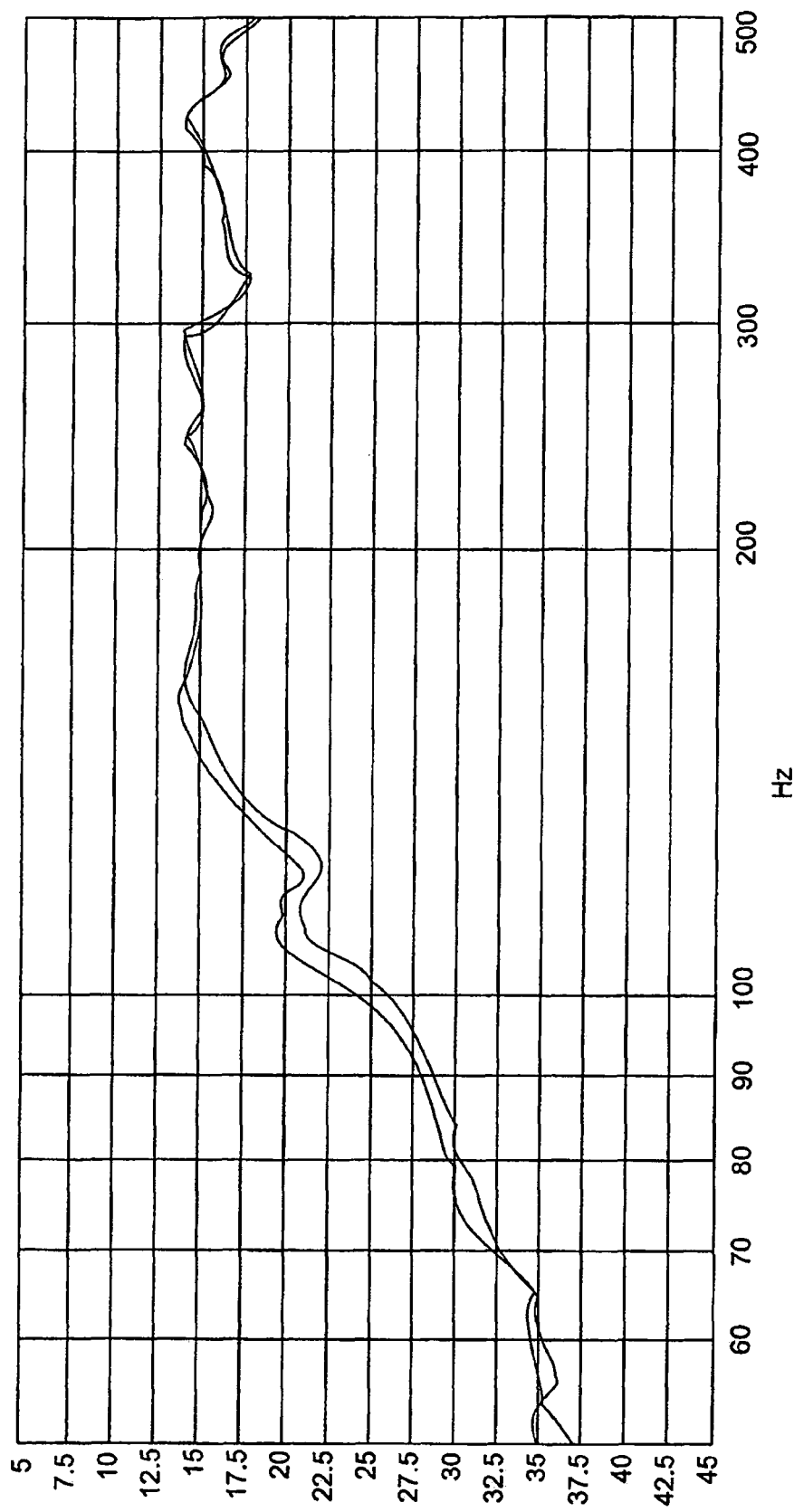
FIG. 5 is a graph showing increased bass output using same coil and magnet in a 4-layer versus a "tandem" configuration after normalizing curves at 500 Hz.
Figure 6:
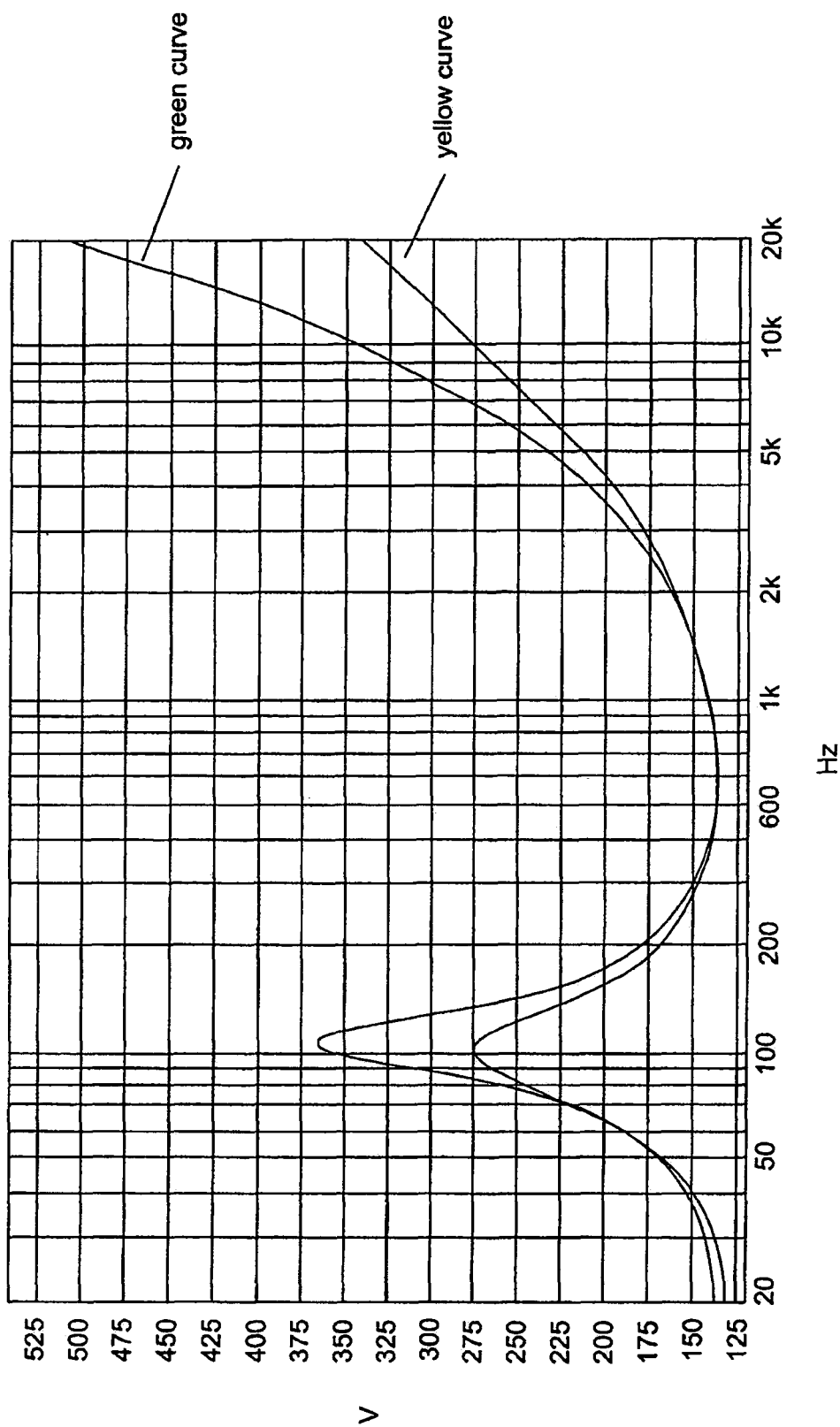
FIG. 6 is a graph showing impedance vs frequency for a magnetic motor according to the invention vs that of conventional motor, e.g., of the type shown in FIG. 2.

FIG. 5 is a graph shows increased bass output using same coil and magnet in a 4-layer versus a "tandem" configuration after normalizing curves at 500 Hz. FIG. 6 is a graph showing impedance vs frequency for a magnetic motor according to the invention vs that of conventional motor, e.g., of the type shown in FIG. 2.

Motors according to the invention fulfill the following significant benefits:

1. Increase of 33% in B×L product while maintaining same moving mass (See FIG. 5);
2. Low drive impedance for improved power intake in low supply voltage applications (See FIG. 6, yellow curve);
3. Reduced inductance compared to normal multi-layer coil also improves high frequency response (See FIG. 6);
4. Low cost construction and manufacturing;
5. Maintains the temperature stability of a high magnetic operating point;
6. Enable four- and six-layer coil construction without undue mass increase;
7. Better utilization of all metal and magnetic materials.

Figure 7:
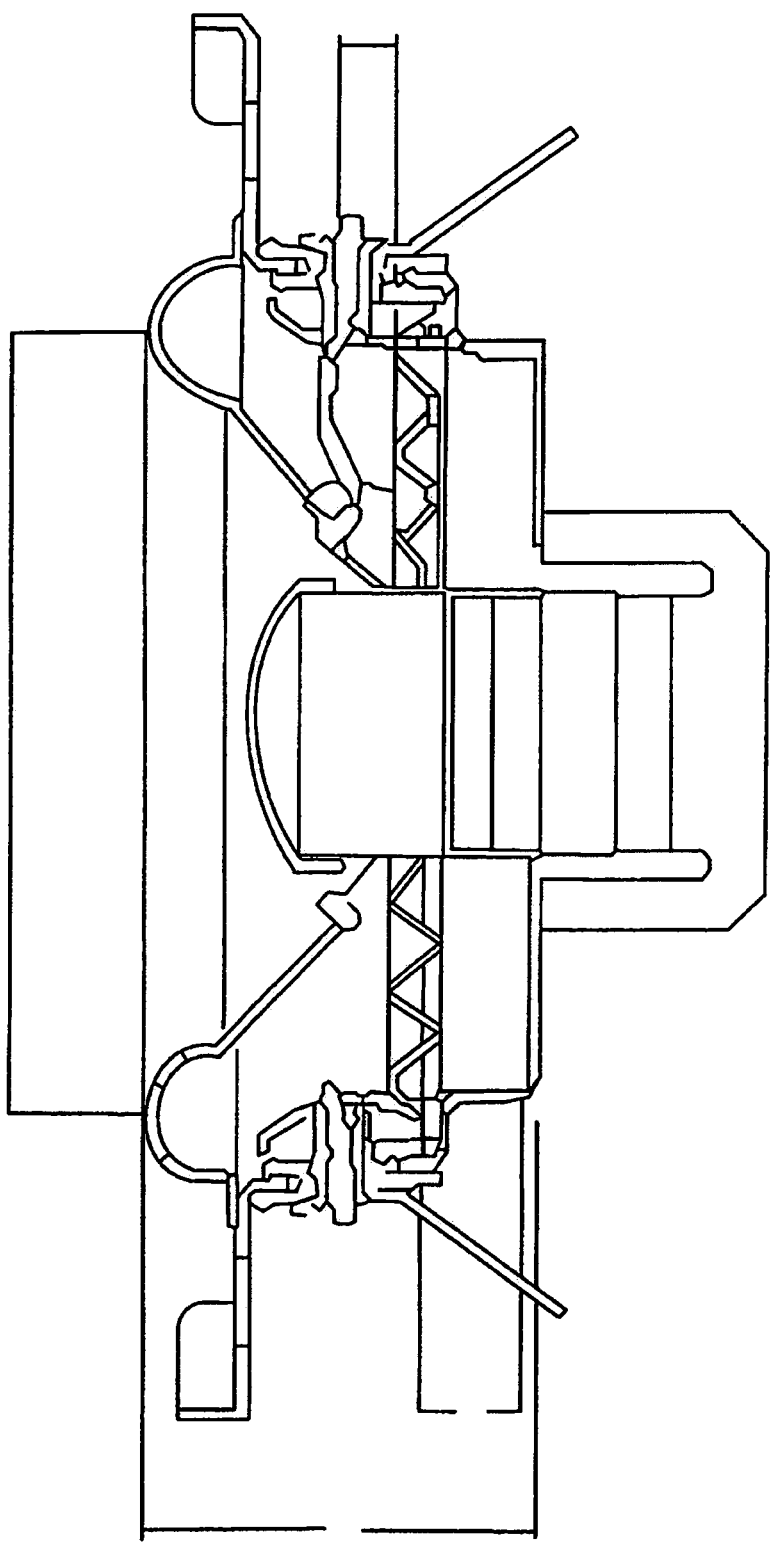
FIG. 7 shows a loudspeaker according to the invention.

FIG. 7 shows a loudspeaker according to the invention. The speaker is of conventional operation and construction, except insofar as it includes a magnetic motor of the type shown in FIGS. 4A-4B and described above.

Described above is an improved magnetic motor and loudspeaker according to the invention. It will be appreciated that the embodiment shown in the drawings and described above are merely examples of the invention and that other motors and loudspeakers incorporating the teachings hereof fall within the scope of the invention, of which I claim:

The invention claimed is:

1. A loudspeaker comprising:
    a voice coil, the voice coil comprising:
        a first layer comprising a first wire coil,
        a second layer comprising a second wire coil,
        each layer of wire coil comprising a separate respective wire,
    the layers of wire coils being connected in parallel and the second layer of wire coil being layered on top of the first layer of wire coil,
    wherein a height of the voice coil is greater than a thickness of the voice coil.

2. A loudspeaker according to claim 1, wherein all of the coils comprise wires having round cross-sections.

3. A loudspeaker according to claim 1, further comprising a magnetic field source comprising a permanent magnet.

4. A loudspeaker according to claim 1, wherein the magnet is a neodymium boron iron magnet.

5. A loudspeaker according to claim 4, wherein the neodymium boron iron magnet has a cylindrical cross-section.

6. A loudspeaker according to claim 1, wherein at least one of the coils comprises a conductor having a round cross-section.

* * * * *